US012618277B2

(12) United States Patent
Goetz et al.

(10) Patent No.: US 12,618,277 B2
(45) Date of Patent: May 5, 2026

(54) HINGE

(71) Applicant: Julius Blum GmbH, Hoechst (AT)

(72) Inventors: Christof Goetz, Lustenau (AT); Thomas Schuler, Hard (AT); David Kirchmair, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/739,933

(22) Filed: Jun. 11, 2024

(65) Prior Publication Data

US 2024/0328225 A1 Oct. 3, 2024

Related U.S. Application Data

(63) Continuation of application No. PCT/EP2022/082779, filed on Nov. 22, 2022.

(30) Foreign Application Priority Data

Dec. 14, 2021 (EP) .................................... 21214290

(51) Int. Cl.
*E05F 1/08* (2006.01)
*E05F 3/20* (2006.01)
*E05F 5/00* (2017.01)

(52) U.S. Cl.
CPC ................ *E05F 3/20* (2013.01); *E05F 5/006* (2013.01)

(58) Field of Classification Search
CPC ........... E05Y 2900/20; E05Y 2900/202; E05Y 2900/204; E05Y 2900/208; E05Y 2201/20;

(Continued)

(56) References Cited

U.S. PATENT DOCUMENTS 7,065,833 B2 * 6/2006 Kropf ..................... E05F 5/006 16/294
7,600,295 B2 10/2009 Zimmer
(Continued)

FOREIGN PATENT DOCUMENTS

DE 102 54 375 11/2003
DE 10 2007 037 480 3/2008
(Continued)

OTHER PUBLICATIONS

International Search Report issued Feb. 28, 2023 in International (PCT) Application No. PCT/EP2022/082779.

*Primary Examiner* — Chuck Y Mah
(74) *Attorney, Agent, or Firm* — Wenderoth, Lind & Ponack, L.L.P.

(57) ABSTRACT

A hinge includes an attachment part to fasten the hinge to a fixed furniture part, an articulated lever, and a hinge cup pivotably arranged on the attachment part via the articulated lever. The articulated lever is mounted with the hinge cup via a hinge pin, and the hinge cup can be fastened to a movable furniture part. A damping device dampens a relative movement between the attachment part and the hinge cup between an open position and a closed position of the hinge, and the damping device has a linear damper with a piston and a translationally movable piston rod. The linear damper is arranged at least in certain regions outside the hinge cup, and the translationally movable actuating element can actuate the damping device. The actuating element is arranged for the most part within the hinge cup.

32 Claims, 11 Drawing Sheets

(58) Field of Classification Search
CPC ........... E05Y 2201/21; E05Y 2201/214; E05Y 2201/216; E05Y 2201/256; E05Y 2201/264; E05Y 2201/266; E05Y 2201/638; E05Y 2600/12; E05Y 16/54; E05Y 16/281; E05Y 16/284; E05Y 16/286; E05F 3/20; E05F 3/108; E05F 5/006; E05F 5/02; E05F 5/10; E05D 11/1021; E05D 11/1042; E05D 11/105; E05D 11/1064; E05D 5/065; E05D 7/04; E05D 7/0407; E05D 7/123; E05D 7/125; E05D 3/142
See application file for complete search history.

(56) References Cited

U.S. PATENT DOCUMENTS

| | | | | |
|---|---|---|---|---|
| 8,424,161 | B2 | 4/2013 | Sutterlütti | |
| 10,280,671 | B2 | 5/2019 | Kirenci et al. | |
| 10,808,442 | B2 | 10/2020 | Salice | |
| 2003/0200625 | A1 | 10/2003 | Zimmer | |
| 2010/0269294 | A1* | 10/2010 | Krammer | E05F 5/02 16/277 |
| 2011/0005032 | A1* | 1/2011 | Domenig | E05F 5/006 16/50 |
| 2011/0298349 | A1 | 12/2011 | Sutterlütti | |
| 2012/0174338 | A1* | 7/2012 | Wu | E05F 5/08 16/297 |
| 2016/0032636 | A1* | 2/2016 | Dai | E05F 5/006 16/65 |
| 2017/0081890 | A1* | 3/2017 | Buschmann | E05F 5/006 |
| 2017/0096849 | A1* | 4/2017 | Kruedener | E05F 5/10 |
| 2017/0350179 | A1 | 12/2017 | Salice | |
| 2018/0155974 | A1 | 6/2018 | Kirenci et al. | |

FOREIGN PATENT DOCUMENTS

| | | |
|---|---|---|
| JP | 2012-521500 | 9/2012 |
| JP | 2018-504537 | 2/2018 |
| WO | 2015/155579 | 10/2015 |
| WO | 2016/102215 | 6/2016 |

* cited by examiner

HINGE

The present application is a continuation of International Application PCT/EP2022/082779 filed on Nov. 22, 2022. Thus, all of the subject matter of International Application PCT/EP2022/082779 is incorporated herein by reference.

BACKGROUND OF THE INVENTION

The invention relates to a hinge, in particular a furniture hinge, comprising an attachment part with which the hinge can be fastened to a stationary furniture part, at least one articulated lever, and a hinge cup which is or can be pivotably arranged on the attachment part via the at least one articulated lever. The at least one articulated lever with the hinge cup is mounted via at least one hinge pin, and the hinge cup can be fastened to a movable furniture part. At least one damping device is provided for damping a relative movement between the attachment part and the hinge cup between an open position and a closed position of the hinge, and the at least one damping device has a linear damper with a piston and a translationally movable piston rod. The linear damper is arranged at least in areas, preferably completely, outside the hinge cup. At least one translationally movable actuating element, which is preferably one-piece and/or separate from the at least one articulated lever, particularly preferably spatially at least in the open position, is provided for actuating the at least one damping device.

Such a hinge is already known from the document WO 2016/102215 A1, in which a linear damper with a slide as actuating element can be fastened to the outside of a hinge cup, and the articulated lever contacts the linearly movable slide through a hinge cup opening in order to actuate the linear damper. The slide is clipped onto the outside of the hinge cup together with the linear damper via a housing.

A disadvantage of the state of the art is that, due to the transfer of the rotational movement of the articulated lever to the slide in the outside area of the hinge, a force distribution on the slide is unfavorable as a force vector induced by the rotation of the articulated lever points orthogonally to the piston rod in the direction of the housing, which is not joined to the hinge cup in a material-bonding manner. As a result, an undesired tilting of the slide between the hinge cup and the housing is promoted and causes an anharmonic damping movement, a high wear of the component parts involved in the damping, and an unfavorable transmission of force onto the linear damper. In addition, the articulated lever has to be very precisely adapted to the slide in terms of geometry and tolerances in order to effect a damping of the hinge in the desired movement range of the articulated lever when it sticks out of the hinge cup. A large hinge cup opening is also required, as a result of which dirt particles, which reduce the functionality of the hinge and its service life, can enter the hinge cup. In addition, additional work steps are required in the installation of the hinge in terms of the preinstallation of the slide and the housing on the hinge cup, which is to be carried out by trained personnel in order to be able to guarantee proper usage of the hinge. An installation space is also increased by the slide being supported on the outside by the housing. Furthermore, a conversion of the rotational movement to the linear movement of the slide is limited by the geometry and location of the hinge cup opening.

SUMMARY OF THE INVENTION

The objective technical problem of the present invention is therefore to specify a hinge that is improved compared with the state of the art, in which the disadvantages of the state of the art are at least partially remedied, and which provides a compact design and/or a particularly favorable transfer of a rotational movement of the at least one articulated lever to the piston rod.

According to the invention, the at least one actuating element is arranged predominantly, preferably completely, inside the hinge cup.

This makes it possible first of all that a force effect transmitted in the course of the rotational movement of the at least one articulated lever can act on the at least one actuating element in the direction of a hinge cup base, more specifically the hinge cup base can act as a counter bearing for the at least one actuating element in the course of a damping movement.

The arrangement of the at least one actuating element predominantly inside the hinge cup means in this context that at least 50%, preferably at least 70%, particularly preferably at least 90%, of the volume of the at least one actuating element is arranged inside the hinge cup.

Added to this is the positive property that the kinematics for actuating the piston rod is integrated in the hinge cup, with the result that a height of the hinge cup and/or a diameter of the hinge cup can be formed particularly small, with the result that a large range of application in pieces of furniture, windows, doors or the like—for example with narrow movable parts or small fastening space for the hinge—can be guaranteed since the hinge is formed particularly compact.

Since the at least one actuating element is arranged inside the hinge cup and the linear damper is preferably arranged on the outside of the hinge cup via a rivet or a pivot pin and, unlike the state of the art, they are not to be fastened to the hinge cup manually in additional work steps in the course of the installation of the hinge on a piece of furniture, an installation time can be reduced and the installation can be carried out particularly easily or in a particularly user-friendly manner.

The arrangement of the at least one actuating element inside also results in the advantage that a translation of the rotational movement of the articulated lever into the rotational movement of the at least one actuating element can be flexibly adapted depending on requirements placed on the hinge (for example via a positioning of a point of application of the at least one articulated lever on the at least one actuating element and/or via a point of application of the piston rod on the at least one actuating element), without being limited by an opening in the hinge.

The damping of the hinge is preferably effected starting from the open position in the direction of the closed position. In general, a damping of the hinge can alternatively or additionally be effected starting from the closed position into the open position—in particular with the two movement portions. For example, by fixing the actuating element on the piston rod, a bilateral damping can be effected, but this is not absolutely necessary. The at least one damping element preferably contacts the piston rod for the damping, particularly preferably exclusively, in a closing movement of the hinge.

As stated at the beginning, protection is also sought for a piece of furniture, comprising at least one stationary furniture part and a movably mounted furniture part, with at least one such hinge. The attachment part of the hinge is arranged on the stationary furniture part, and the hinge cup is arranged on the movable furniture part, in particular integrated in the movable furniture part at least in areas.

The hinge is preferably used in furniture carcasses with flaps. However, the hinge can generally also be used in windows/window frames, doors/door frames etc.

According to an advantageous design of the invention, the at least one actuating element comprises a support surface or support means via which the at least one actuating element is, preferably indirectly or directly, arranged on an inside of a hinge cup base, and/or is guided inside the hinge cup in a groove or indentation in the hinge cup.

This makes it possible for the at least one actuating element to be supported on the inside of the hinge cup—in particular without interacting with an optionally present hinge cup cover—and this promotes a transmission of force between hinge cup and the at least one articulated lever for a particularly harmonic and/or low-wear damping movement.

The support surface can generally comprise at least one sliding element, at least one support means, and/or at least one guide device, with which the at least one actuating element is indirectly in contact with the hinge cup. For example, through at least one strip or at least one nub on the at least one actuating element or a sliding element arranged on the at least one actuating element, a friction between the at least one actuating element and the hinge cup and/or an optionally present actuating element cover can be reduced, as a result of which the service life of the hinge can be increased.

Alternatively or in addition, the at least one actuating element can be translationally guided in at least one lateral groove of at least one hinge cup side wall, preferably spaced apart from the hinge cup base.

The at least one actuating element can act as a movement limit for the hinge and/or as a damping stroke limit in the sense of a stop—for example by contacting the hinge cup side wall or an optionally present hinge cup opening.

Advantageously, the hinge cup comprises a hinge cup opening through which the piston rod projects out of an exterior space of the hinge cup into the interior space of the hinge cup that is separated by a hinge cup side wall of the hinge cup. Preferably, in the open position and/or the closed position, the piston rod is arranged with some areas inside and some areas outside the hinge cup.

Through the hinge cup opening, the kinematics can be transferred from the interior space of the hinge cup via the piston rod to the linear damper arranged on the outside, and the hinge cup opening can be adapted to a geometry of the piston rod such that a contamination of the interior space of the hinge cup is minimized.

In general, a further damping device is present, which is arranged on the outside of the hinge cup, symmetrical or mirrored, for example, about a longitudinal extent of the hinge.

It has proved to be beneficial that a hinge cup cover is provided, with which the at least one damping device can be covered at least in areas, preferably completely. Preferably, the hinge cup cover can be or is clipped onto the hinge cup and/or comprises at least one receiving area, preferably corresponding to the geometry of the at least one damping device.

A contamination of the at least one damping device and/or of the hinge cup can be particularly effectively prevented by a hinge cup cover.

According to an advantageous embodiment of the invention, the at least one damping device is arranged on the outside of the hinge cup, preferably rotatable or rigid and/or via a rivet or a pivot pin.

For example, a rotatable mounting on the hinge cup can make a slight pivoting movement of the damping device possible. In the case of a rigid connection via a rivet, no additional supporting of the at least one damping device on the hinge cup is necessary.

It has proved to be advantageous that the hinge cup comprises at least one reinforcing indentation. Preferably, the at least one damping device can be brought to rest against the at least one reinforcing indentation and/or is arranged on the at least one reinforcing indentation.

The at least one reinforcing indentation increases a stability and/or strength of the hinge cup, and installation space for the arrangement of the at least one damping device, which can serve as support for the damping device in the sense of a dual function, can be generated.

The actuation of the at least one damping device is preferably effected exclusively translationally, and a linear movement of the piston rod with respect to the linear damper can generally be overlapped with a pivoting movement of the at least one damping device. A pivoting movement can be blocked for example via the at least one reinforcing indentation and/or the at least one hinge cup cover.

An advantageous variant of the present invention is that the at least one actuating element comprises a preferably substantially rectangular opening or recess and/or the hinge cup base comprises a further recess or further opening. The further recess or further opening overlaps the opening or recess at least in areas, preferably completely, between the open position and the closed position, and it is preferably provided that the at least one actuating element is formed as a metallic sheet metal part.

Through the opening or recess, the at least one articulated lever can contact the at least one actuating element in the course of a rotational movement of the at least one articulated lever without at the same time jamming the at least one actuating element with the hinge cup, since the at least one articulated lever can engage in the opening or recess during the closing and/or opening movement of the hinge and if necessary shift the position of the opening or recess. Analogously, the at least one articulated lever can engage in the further recess or further opening, wherein the hinge cup base can be arranged closer to the at least one articulated lever in order, for example, to reduce a height of the hinge cup and/or to increase a damping stroke of the at least one damping device.

It is particularly preferable that the at least one actuating element comprises at least one profiling, preferably arranged next to an optionally present opening or recess, and the at least one articulated lever comprises at least one control contour, preferably in the form of an undercut corresponding to the at least one profiling. The at least one actuating element can be returned to a starting position before a damping stroke between the closed position and the open position due to a movement coupling between the at least one profiling and the at least one control contour. Preferably, the at least one actuating element can be supported on the hinge cup and/or at least one optionally present reinforcing indentation via the at least one profiling.

Through the at least one profiling, the at least one control contour of the at least one articulated lever can come into engagement in the course of an opening movement of the hinge, with the result that the at least one actuating element is moved back into a starting position before a damping stroke. Alternatively or in addition, the at least one actuating element can be returned by a return spring in the linear damper.

In the sense of a dual function, the at least one profiling can also generate a lateral support for guiding the at least one actuating element inside the hinge cup. The at least one control contour is preferably formed such that an arrangement of the at least one profiling on the at least one control contour and/or in the undercut, at least in areas, is effected through the rotation of the at least one articulated lever.

In general, the at least one control curve can alternatively or additionally also be arranged on an optionally present coupling mechanism, and the at least one control curve is arranged indirectly on the at least one articulated lever.

In an embodiment of the invention, the at least one actuating element comprises at least one bar, which preferably protrudes transversely from the at least one actuating element and/or is bent, for contacting the piston rod, preferably inside the hinge cup.

Through the at least one bar, a translational movement of an actuating element arranged in the middle of the hinge cup toward the piston rod arranged on the side of the hinge cup can be implemented in order to actuate the damping device arranged on the outside of the hinge cup.

According to a preferred embodiment of the invention, at least one coupling mechanism, which is preferably joined to the at least one articulated lever in a material-bonding manner and/or is separate from the at least one articulated lever, is provided and converts a rotational movement of the at least one articulated lever into a linear movement of the at least one actuating element. Preferably, the at least one coupling mechanism is formed as a plastic part and/or arranged on the at least one hinge pin via at least one support.

The at least one coupling mechanism acts as a transmission means between the rotational movement of the at least one articulated lever and the translational movement of the at least one actuating element, and the at least one coupling mechanism can be formed as part of the articulated lever or as a separate part joined to the articulated lever.

In general, the at least one actuating element can also be comprised by the at least one articulated lever and/or represent an integral part of the at least one articulated lever. The at least one actuating element is preferably separate from the articulated lever in order to contact the at least one coupling mechanism from a particular angle of the at least one articulated lever for actuating the at least one damping device.

It has proved to be beneficial that the at least one coupling mechanism comprises at least one fastening mechanism for arranging the at least one coupling mechanism on the at least one articulated lever. Preferably, the at least one coupling mechanism engages in an optionally present opening or recess in the at least one actuating element during an actuation of the at least one damping device.

Furthermore, the at least one actuating element comprises a contact surface for contacting the at least one coupling mechanism. The at least one coupling mechanism and the contact surface are movement-coupled between the open position and the closed position in order to activate the at least one damping device via a rotational movement of the at least one articulated lever. Preferably, the at least one coupling mechanism comprises a control curve for translating a rotational movement of the at least one articulated lever into a linear movement of the piston rod.

Through the preferably planar contact surface, the at least one coupling mechanism can contact the at least one actuating element in order to damp the hinge. A rotational movement of the at least one articulated lever can be adjusted via a thickness of the at least one coupling mechanism and a movement coupling to the at least one actuating element can be adjusted via the control curve. The control curve of the at least one coupling mechanism is preferably formed convex.

In a further embodiment, in a first movement portion starting from the open position of the hinge in the direction of the closed position of the hinge, the at least one coupling mechanism is formed contactless with respect to the at least one actuating element and/or, in a second movement portion preferably following the first movement portion, is in contact with the at least one actuating element. Preferably, the at least one damping device can be activated by the at least one coupling mechanism via the at least one actuating element, preferably exclusively, in the second movement portion.

This guarantees that the damping of the hinge is effected from a particular angle of the at least one articulated lever, or exclusively in one movement portion. In the second movement portion, the at least one articulated lever reaches an angle at which the at least one coupling mechanism (or the at least one articulated lever) preferably contacts the at least one actuating element in order to activate the damping.

According to an advantageous design of the invention, an actuating element cover is provided for the translational guiding and/or securing of the at least one actuating element inside the hinge cup, and the at least one actuating element is arranged between the hinge cup base and the actuating element cover. Preferably, the actuating element cover, the hinge cup base, and/or the at least one actuating element comprises at least one guide device for guiding the at least one actuating element. The actuating element cover comprises fastening elements for positive locking with the hinge cup base and/or the actuating element cover comprises a cover bar, which preferably protrudes transversely from the at least one actuating element cover and/or is bent, inside the hinge cup.

The at least one actuating element cover can secure the at least one actuating element relative to the hinge cup base and guide it linearly with respect to the hinge cup side wall. For example, a cover bar bent in the form of a tab can secure the bar of the at least one actuating element so that it contacts the piston rod properly.

It is particularly preferable that the at least one actuating element and/or the at least one actuating element cover is formed asymmetrical. However, in the case of a symmetrical arrangement of damping devices, a symmetrical design—for example for transmitting force to two linear dampers on both sides—is also possible.

The at least one guide device can alternatively or additionally also be arranged on the hinge cup and/or on the at least one actuating element.

It is preferable that at least one sliding element, preferably in the form of a film or nubs, is arranged on the at least one actuating element for reducing friction between the at least one actuating element and the hinge cup base and/or the at least one actuating element and an optionally present actuating element cover.

Here, the sliding element can be regarded as part of the at least one actuating element, wherein the nubs or at least one strip can also be arranged directly on the at least one actuating element, for example.

It is also preferable that the at least one damping device is arranged substantially parallel to the at least one actuating element.

BRIEF DESCRIPTION OF THE DRAWINGS

Further details and advantages of the present invention will be explained in more detail below with reference to the drawings, in which.

DETAILED DESCRIPTION OF THE INVENTION

Figure 1A:
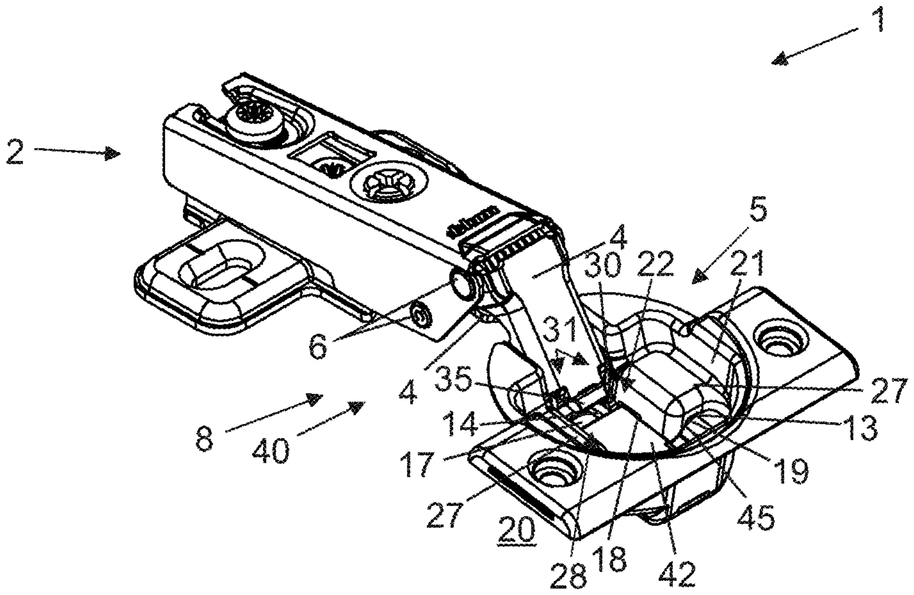
FIGS. 1*a*-1*b* show a hinge according to a particularly preferred embodiment in a perspective view and an exploded representation.

FIG. 1*a* shows a hinge 1 in the form of a furniture hinge comprising an attachment part 2 with which the hinge 1 can be fastened to a stationary furniture part 3, two articulated levers 4 and a hinge cup 5 pivotably arranged on the attachment part 2 via the articulated levers 4. The articulated levers 4 with the hinge cup 5 are mounted on the hinge cup (concealed by a hinge cup top in the representation) via two hinge pins 6, and the hinge cup 5 can be fastened to a movable furniture part 7 (see FIG. 11). The number of articulated levers 4 and hinge pins 6 is generally as desired.

Figure 1B:
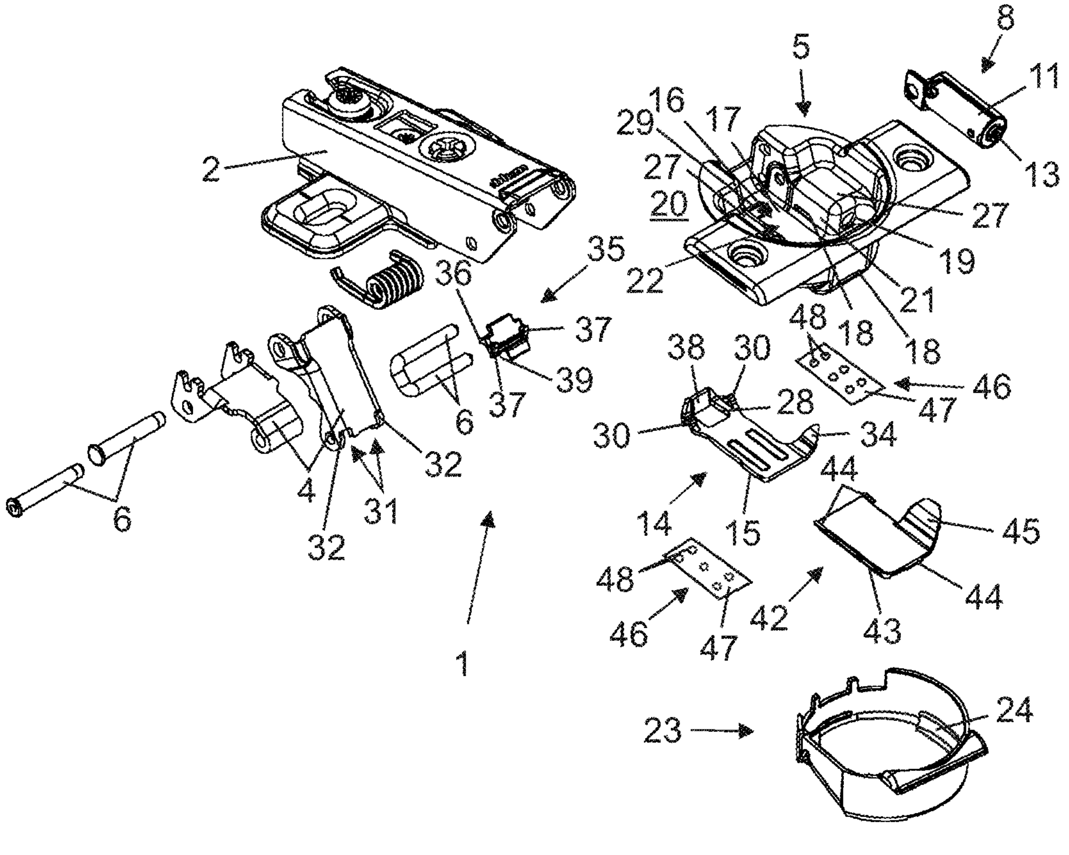

FIG. 1*b* shows the hinge 1 in an exploded representation, wherein the hinge 1 comprises a damping device 8 for damping a relative movement between the attachment part 2 and the hinge cup 5 between an open position 9 (see FIG. 5) and a closed position 10 (see FIG. 4) of the hinge 1. The damping device 8 has a linear damper 11 with a piston 12 and a translationally movable piston rod 13, and the linear damper 11 is arranged completely outside the hinge cup 5.

The hinge comprises a translationally movable actuating element 14, which is one-piece and spaced apart from the articulated lever 4 in the open position 9, for actuating the damping device 8, wherein the actuating element 14 is arranged completely inside the hinge cup 5.

A hinge cup cover 23 is provided, with which the damping device 8 can be covered, wherein the hinge cup cover 23 can be clipped onto the hinge cup 5 and comprises a receiving area 24 corresponding to the geometry of the damping device 8. However, the hinge cup cover 23 is generally not absolutely necessary.

The actuating element 14 comprises a support surface 15, which has support means for contacting a hinge cup base 17, via which the actuating element 14 is arranged on an inside 16 of the hinge cup base 17.

In general, the actuating element 14 can alternatively or additionally be guided inside the hinge cup 5 in a groove 18 or indentation in the hinge cup 5. In the embodiment of the hinge 1 shown, grooves 18 are provided in order to mount an actuating element cover 42 on the hinge cup 5, but they can generally also be used to guide the actuating element 14 laterally or vertically.

The actuating element 14 can be arranged on the hinge cup base 17 directly via the support surface 15 or the support means or contact the hinge cup base 17 indirectly—for example via a sliding element 46.

The embodiment shown comprises two sliding elements 46 in the form of films 47 with nubs 48, wherein the film 47 can generally be formed without nubs 48, the nubs 48 can be arranged on the actuating element 14, the hinge cup base 17 or the actuating element cover 42. One or both of the sliding elements 46 (or the nubs 48) for reducing friction between the actuating element 14 and the hinge cup base 17 or the actuating element 14 and the actuating element cover 42 can generally also be dispensed with.

The actuating element cover 42 is provided for the translational guiding and securing of the actuating element 14 inside the hinge cup 5, wherein the actuating element 14 is arranged between the hinge cup base 17 and the actuating element cover 42.

The actuating element cover 42 comprises a guide device 43 for guiding the actuating element 14 inside the hinge cup 5 via a lateral surface of the actuating element 14. The actuating element cover 42 comprises fastening elements 44 for positive locking with the hinge cup base 17. The actuating element cover 42 comprises a cover bar 45, which protrudes transversely from the actuating element cover 42 and is bent, inside the hinge cup 5. In general, the guide device 43 and the fastening elements 44 can also alternatively or additionally be arranged on the actuating element 14.

The actuating element 14 comprises a bar 34, which protrudes transversely from the actuating element 14 and is bent, for contacting the piston rod 13 inside the hinge cup 5 and, in the use position of the hinge 1, is covered and secured by the cover bar 45.

For the kinematics with respect to the articulated levers 4, the hinge 1 comprises a cuboidal helical spring which is supported on a bolt, wherein the bolt is mounted in a forked receiver of one of the two articulated levers 4. Here, the bolt is spaced apart from the hinge pin 6 which defines the rotational movement of the articulated lever 4. The bolt is mounted rotatable in the forked receiver, as a result of which a closing and opening movement of the hinge 1 is effected in a particularly beneficial manner.

Figure 2A:
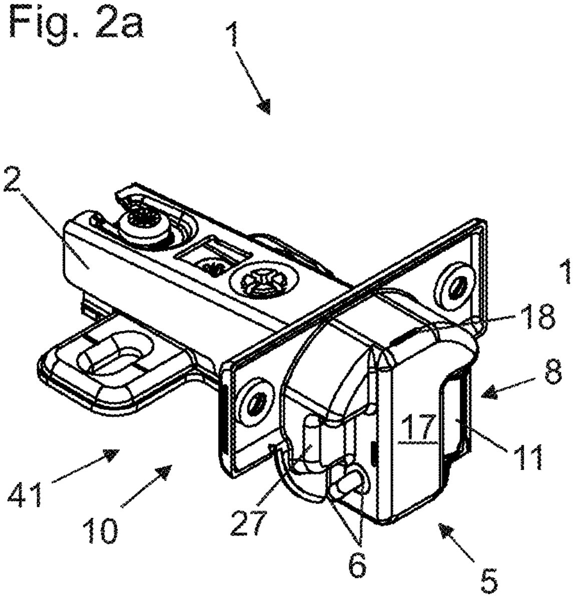
FIGS. 2*a*-2*d* show the hinge according to the embodiment according to FIG. 1*a* in the closed position in two perspective views and in the open position in two perspective views, FIG. 3 show the hinge according to the embodiment according to FIG. 1*a* with a sectional representation through a hinge cup in a view from the side, an enlarged detail view and a view from above to illustrate the section plane.

FIG. 2*a* shows the hinge 1 in the closed position 10, wherein the hinge cup 5 and the attachment part 2 comprise fastening mechanisms for fixing the hinge 1 on furniture parts, door parts, window parts etc. via fastening means.

Figure 2B:
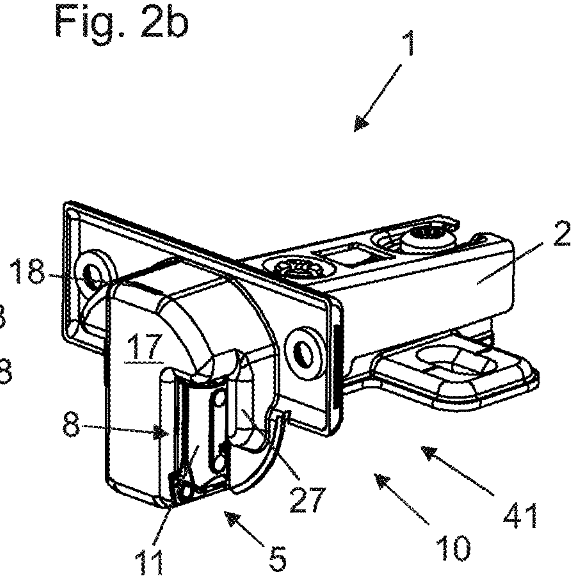

FIG. 2*b* differs from FIG. 2*a* only by a changed angle of view onto the hinge 1, in which the side of the hinge cup 5 is visible, on the outside of which the damping device 8 is arranged.

Figure 2C:
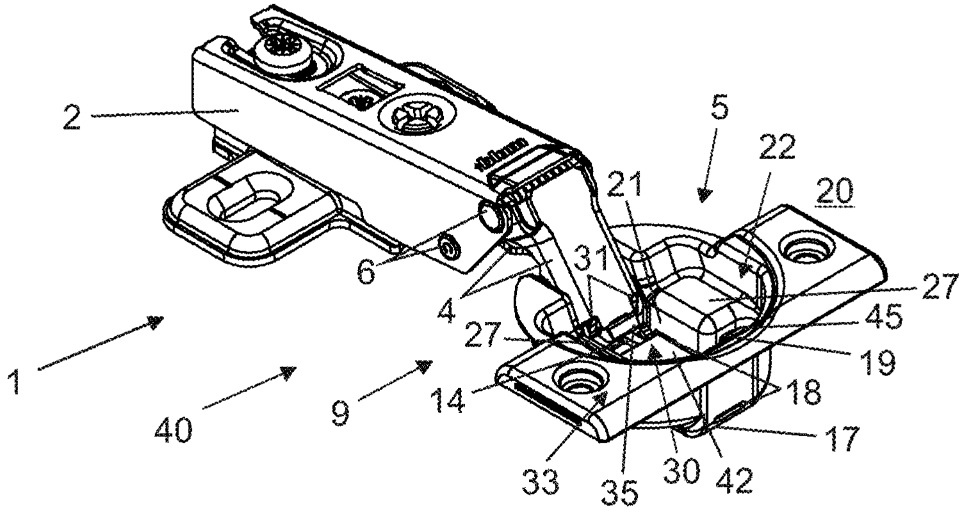

FIG. 2*c* shows the hinge in the open position 9, wherein the hinge cup 5 comprises two reinforcing indentations 27 arranged symmetrically around a longitudinal extent of the hinge 1. The damping device 8 can be brought to rest against one of the two reinforcing indentations 27 and is arranged on the reinforcing indentation 27. The reinforcing indentation 27 can support the linear damper 11 against a pivoting movement, wherein a translational movement of the piston rod 13 can generally be overlapped by a slight pivoting movement of the damping device 8.

Figure 2D:
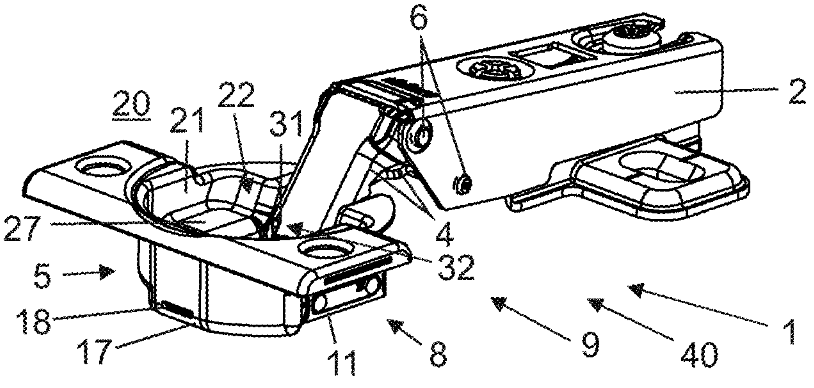

FIG. 2*d* differs from FIG. 2*c* only by a changed angle of view onto the hinge 1, in which the side of the hinge cup is visible, on the outside of which the linear damper 11 is arranged.

Figure 3:
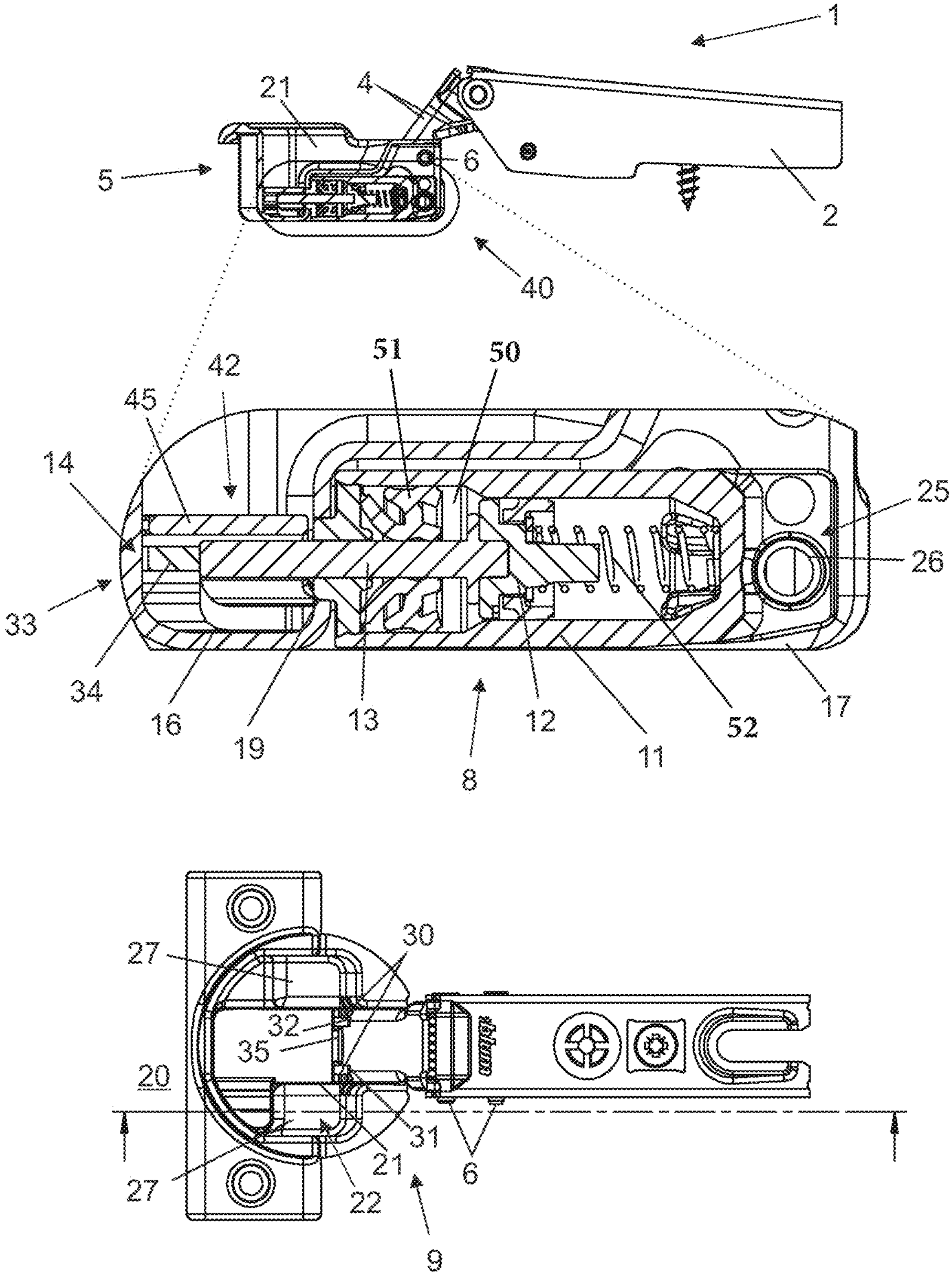

FIG. 3 shows the hinge 1 with a sectional representation through the damping device 8. The hinge cup 5 comprises a hinge cup opening 19 through which the piston rod 13 projects out of an exterior space 20 of the hinge cup 5 into the interior space 22 of the hinge cup 5 that is separated by a hinge cup side wall 21 of the hinge cup 5.

In the open position 9 and the closed position 10, the piston rod 13 is arranged with some areas inside and some areas outside the hinge cup 5. In the embodiment shown, a damping of the hinge 1 is effected starting from the open position 9 in the direction of the closed position 10, wherein in general a damping in the direction of the open position 9 is alternatively or additionally conceivable.

As shown in FIG. 3, the damping device 8 comprises a volume compensation element 50 arranged between the piston 12 and the hinge cup opening 19. The damping device 8 also comprises a braking element 51 arranged between the piston 12 and the linear damper 11, wherein the braking element 51 is formed Z-shaped in cross section. The damping device 8 also comprises a return spring 52, which is arranged in the linear damper 11 and moves the piston rod 13 back into a starting position 33 of the piston rod 13 before the damping stroke after a damping stroke has been effected. In general, the return spring 52 can be dispensed with, wherein the piston rod 13 can be returned to the starting position 33 via a movement coupling of the articulated lever 4 to the actuating element 14 between the closed position 10 and the open position 9.

The damping device 8 is arranged on the outside of the hinge cup 5 via a pivot pin 26 in the form of a rivet 25.

Figure 4:
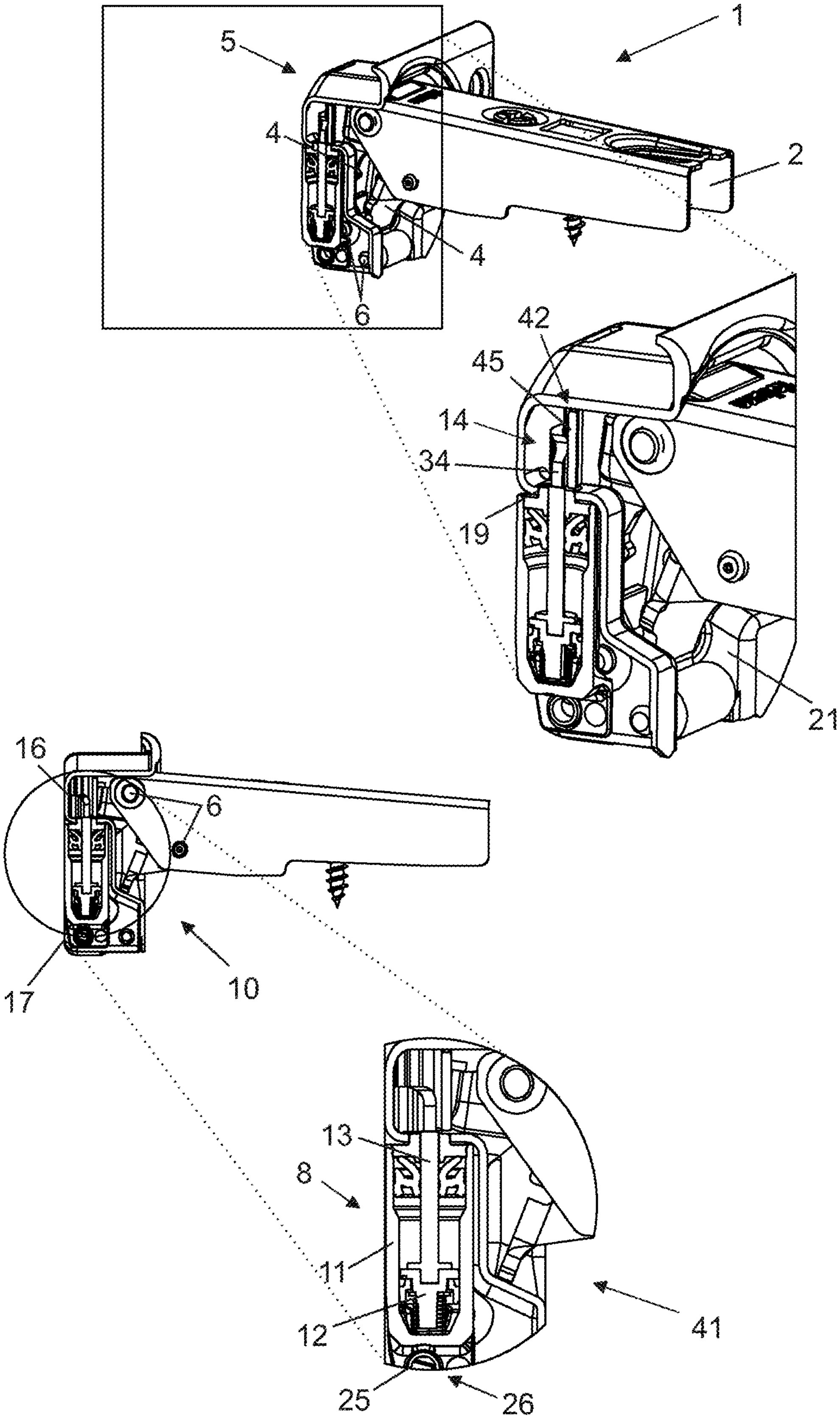
FIGS. 4-5 show the hinge according to the embodiment according to FIG. 3 in the closed position and in the open position, in each case in a perspective view and a view from the side with enlarged detail sections of the hinge cup.

FIG. 4 shows the hinge 1 in the closed position 10, wherein the damping device 8 (as in the open position 9) is arranged parallel to the actuating element 14 and is oriented orthogonal to the bar 34 of the actuating element 14.

Through a rotation of the articulated lever 4, the actuating element 14 has been moved linearly relative to the hinge cup 5 inside the hinge cup 5 via contact with a coupling mechanism 35 (see FIGS. 10*a*-10*d*) separate from and arranged on the articulated lever 4. As a result, the piston rod 13 has been moved into the linear damper 11 of the damping device 8 via the contact of the actuating element 14 with the piston rod 13.

Figure 5:
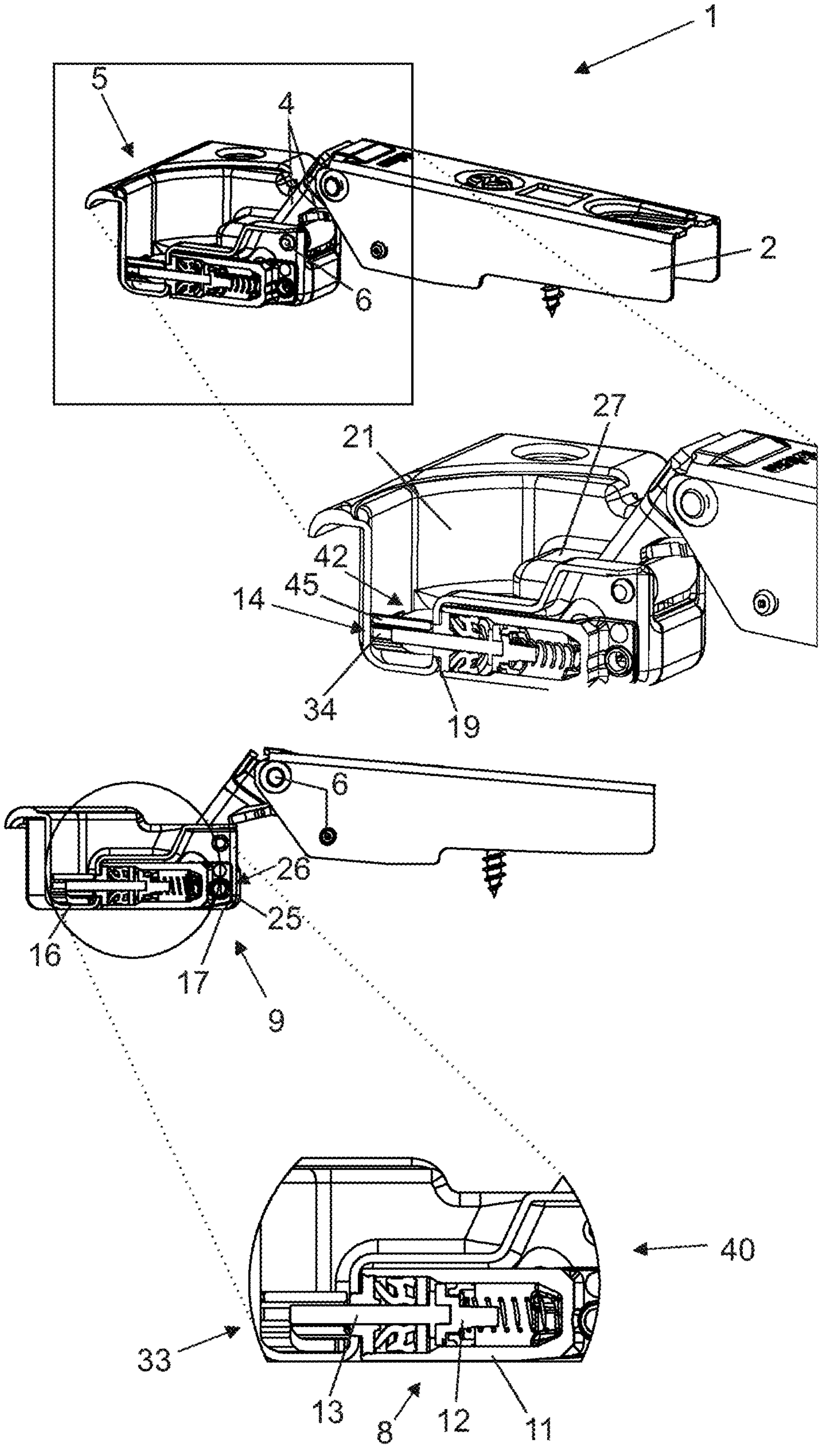

FIG. 5 differs from FIG. 4 only to the effect that the hinge 1 is in the open position 9, wherein the piston rod 13 is in a starting position 33 before a damping stroke or an activation of the damping device 8.

The coupling mechanism 35 does not yet contact the actuating element 14, as a result of which there is no damping of the hinge 1 until an angle of the articulated lever 4 at which a movement coupling between the actuating element 14 and the articulated lever 4 is generated.

Figure 6:
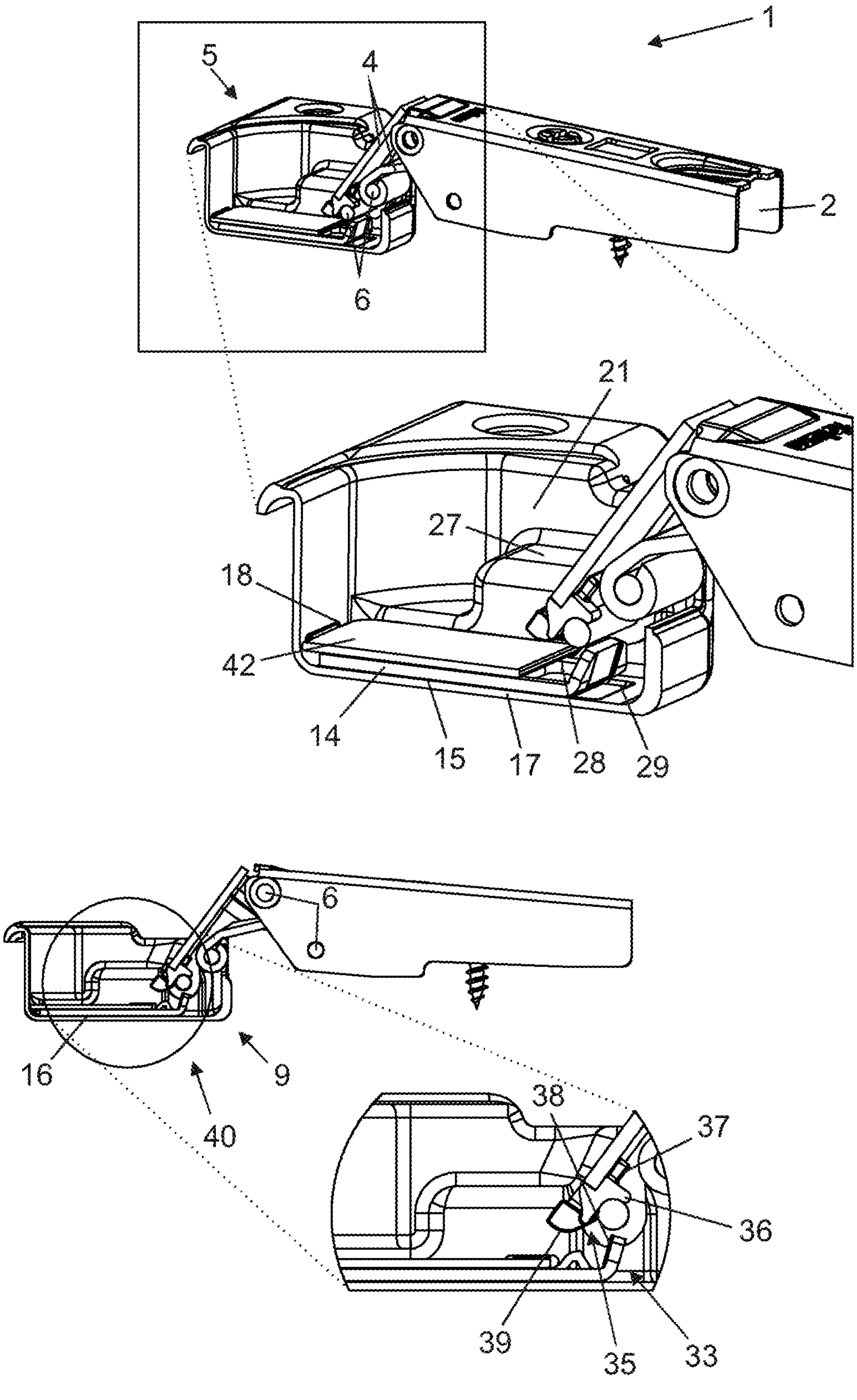
FIGS. 6-8 show the hinge according to the embodiment according to FIG. 3 in different positions between the open position and the closed position, in each case in a perspective view and a view from the side with enlarged detail sections of the hinge cup.

FIG. 6 shows the coupling mechanism 35, which is separate from the articulated lever 4 and converts a rotational movement of the articulated lever 4 into a linear movement of the actuating element 14.

The coupling mechanism 35 is formed as a plastic part and arranged on the hinge pin 6 via a support 36. In general, the coupling mechanism 35 can be designed as a sheet metal part or joined to the articulated lever 4 in a material-bonding manner as an integral part.

Figure 7:
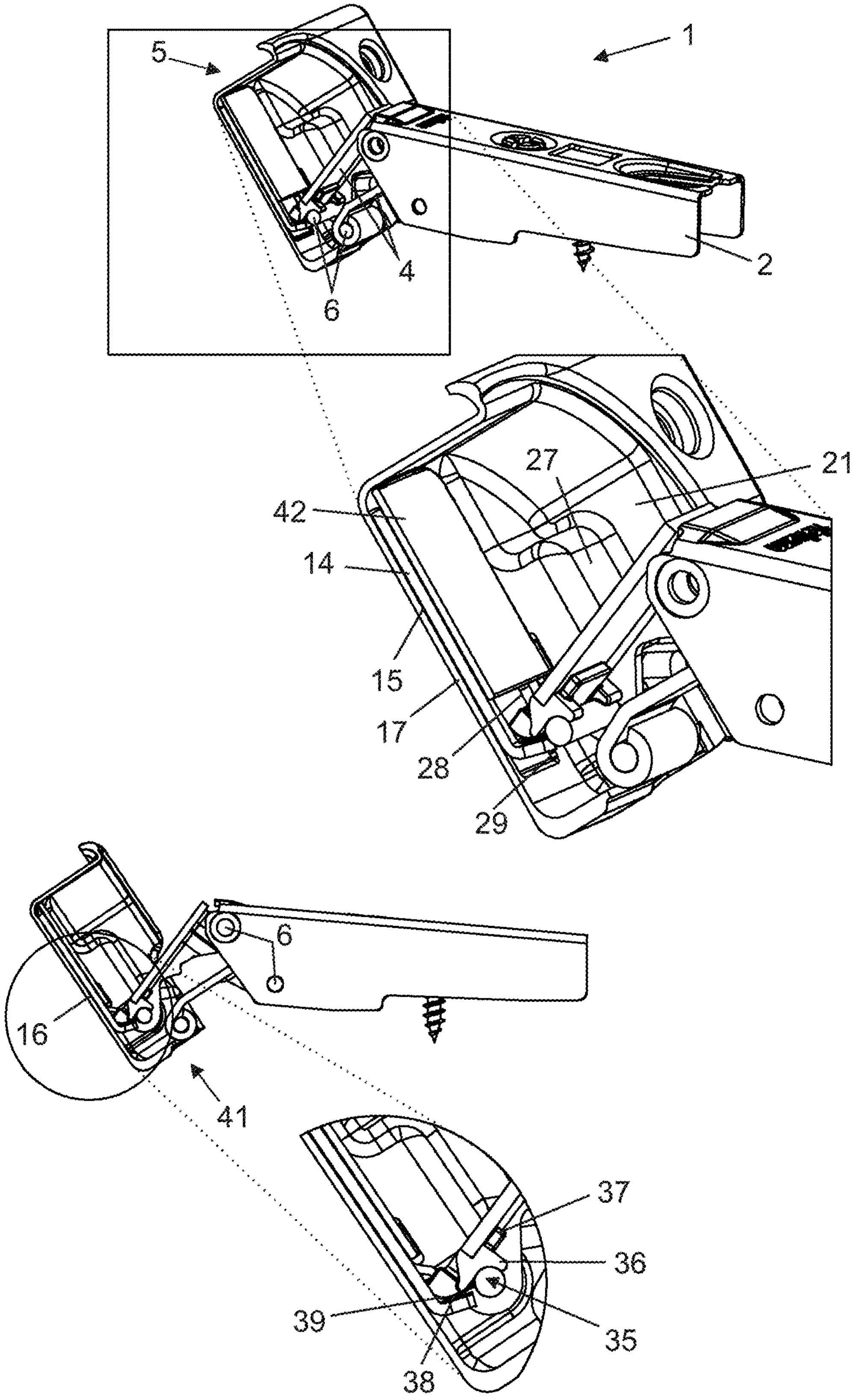

FIG. 7 shows that the actuating element 14 comprises a rectangular opening 28, in which areas of the coupling mechanism 35 engage in the course of a closing movement or opening movement of the hinge 1. The opening 28 can generally also be designed as a recess.

The hinge cup base 17 comprises a further recess 29 (which can generally also be in the form of a further opening), and the further recess 29 sometimes partially overlaps the opening 28 and sometimes overlaps the opening 28 completely between the open position 9 and the closed position 10. The actuating element 14 is formed as a metallic sheet metal part but can generally be in the form of a plastic part.

In a first movement portion 40 starting from the open position 9 of the hinge 1 in the direction of the closed position 10 of the hinge 1 (FIG. 6), the coupling mechanism 35 is formed contactless with respect to the actuating element 14. In a second movement portion 41 following the first movement portion 40 (FIG. 7), the coupling mechanism 35 is in contact with the actuating element 14. In this embodiment, the damping device 8 can be activated by the coupling mechanism 35 via the actuating element 14 exclusively in the second movement portion 41, wherein a damping of the hinge 1 during the entire movement of the hinge 1 between the open position 9 and the closed position 10 is generally also conceivable.

Figure 8:
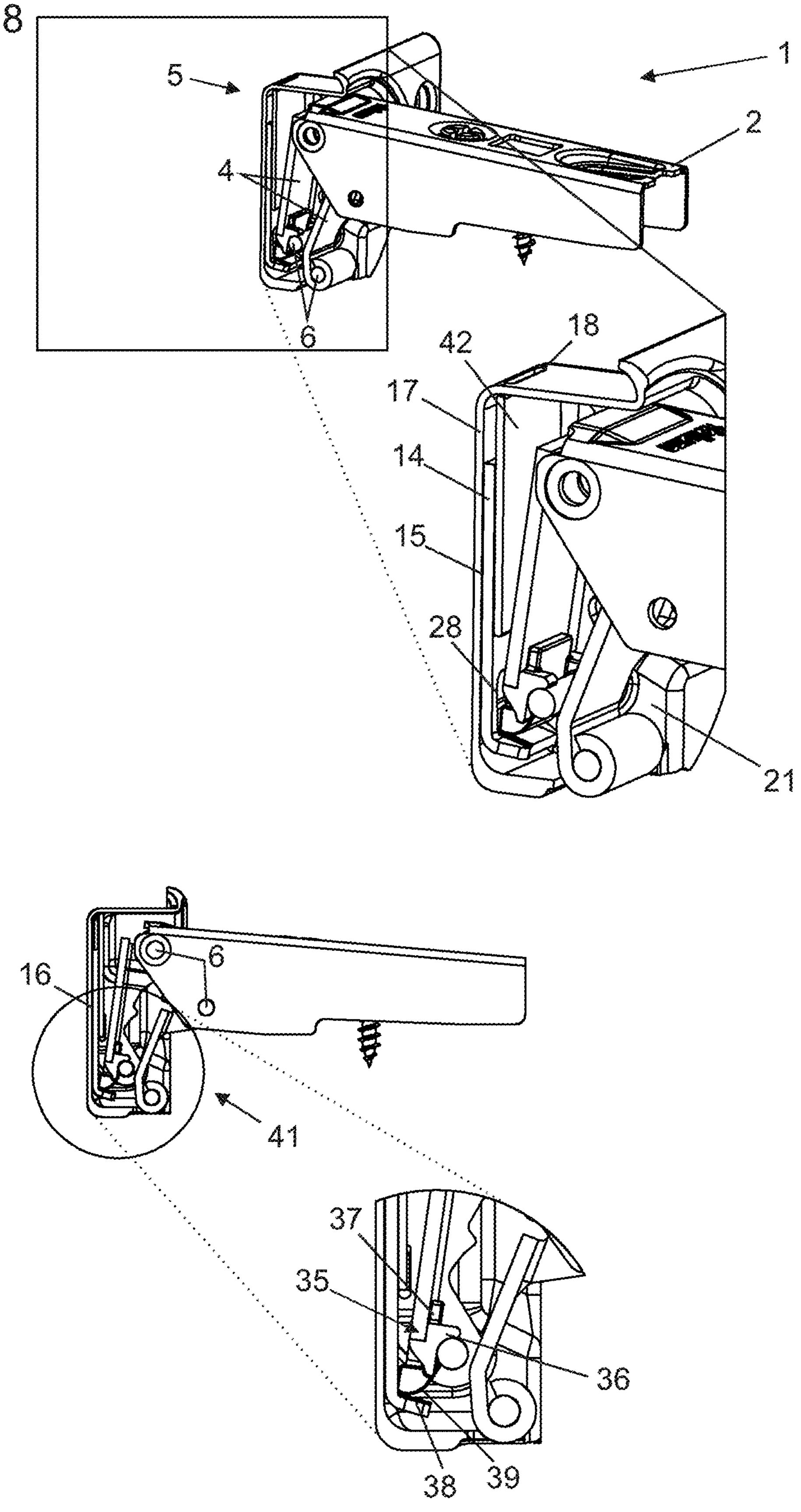

FIG. 8 shows the coupling mechanism 35 arranged in the hinge cup 5, wherein the coupling mechanism 35 comprises fastening mechanisms 37 for arranging the coupling mechanism 35 on the articulated lever 4.

During an actuation of the damping device 8, the coupling mechanism 35 engages in the opening 28 in the actuating element 14 and moves the actuating element 14 translationally due to the rotational movement of the articulated lever 4.

Figure 9A:
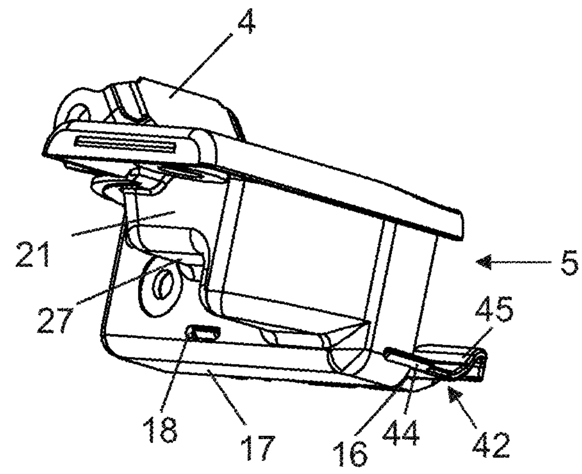
FIGS. 9*a*-9*c* show component parts of the hinge according to the embodiment according to FIG. 1*a* for actuating a damping device in sectional representation through the hinge cup in three different perspective views.

FIG. 9*a* shows component parts which are necessary for activating the damping device 8. Here, the hinge cup 5 is only partially represented in order to make the positioning of the actuating element cover 42 and the actuating bar 45 in the form of a tab visible.

Figure 9B:
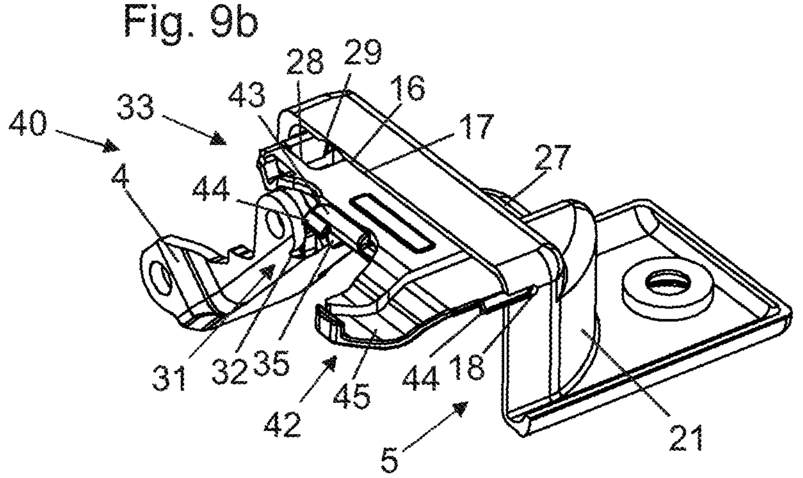

FIG. 9*b* shows the component parts according to FIG. 9*a* in a perspective view onto the underside of the hinge cup 5, wherein the actuating element 14 comprises two profilings 30 arranged next to the opening 28.

The articulated lever 4 comprises two control contours 31 in the form of undercuts 32 corresponding to the profilings 30, wherein the actuating element 14 can be returned to a starting position 33 before a damping stroke between the closed position 10 and the open position 9 by a contact between the profilings 30 and the control contours 31. In general, only one profiling 30 and one control contour 31 can also be provided.

The actuating element 14 can be supported on the reinforcing indentations 27 of the hinge cup 5 via the profilings 30, but the profilings 30 can generally also be spaced apart from the hinge cup 5.

Figure 9C:
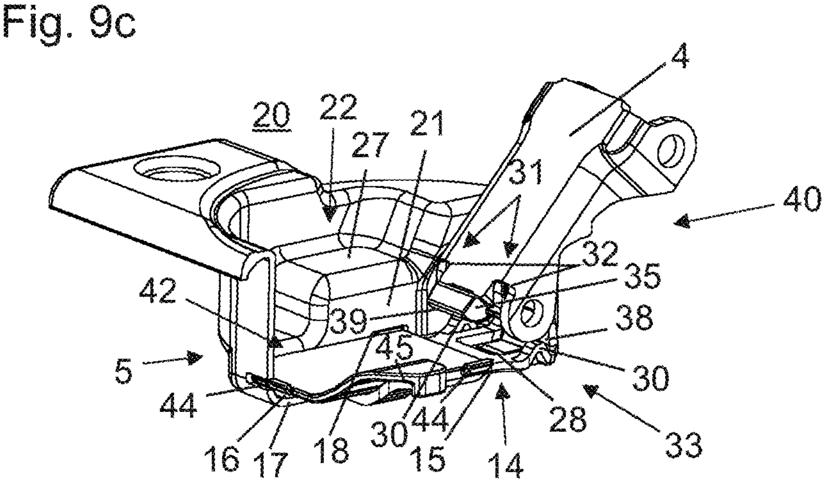

FIG. 9*c* shows that the actuating element 14 comprises a contact surface 38 for contacting the at least one coupling mechanism 35. The at least one coupling mechanism 35 and the contact surface 38 are movement-coupled between the open position 9 and the closed position 10 in order to activate the at least one damping device 8 via a rotational movement of the at least one articulated lever 4. Preferably, the at least one coupling mechanism 35 comprises a control curve 39 for translating a rotational movement of the at least one articulated lever 4 into a linear movement of the piston rod 13.

FIGS. 10*a* to 10*d* illustrate the movement coupling in areas between articulated lever 4 and coupling mechanism 35 with the actuating element 14, and the positioning of the actuating element 14 relative to the actuating element cover 42.

Figure 10A:
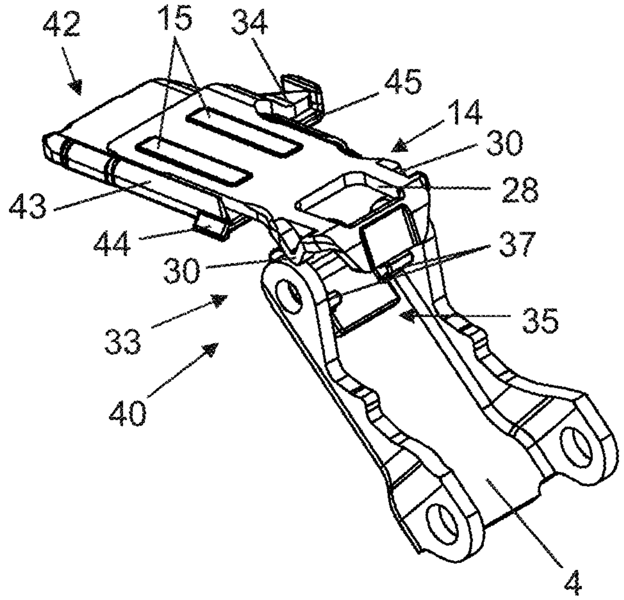
FIGS. 10*a*-10*d* show component parts of the hinge according to the embodiment according to FIG. 1*a* for actuating a damping device, without the hinge cup being represented, in four different perspective views.

FIG. 10*a* represents the component parts for activating the damping device 8 in a perspective view in the direction of the support surface 15, which can be formed by the support means or a sliding element arranged on the support surface 15 or support means in conjunction with the actuating element 14.

Figure 10B:
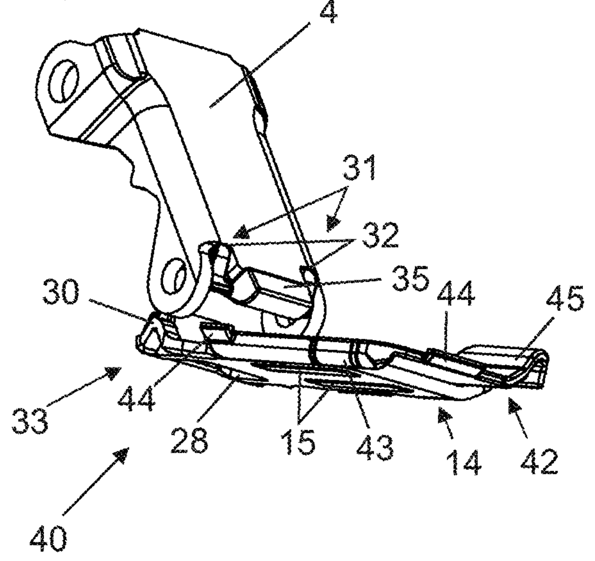
Figure 10C:
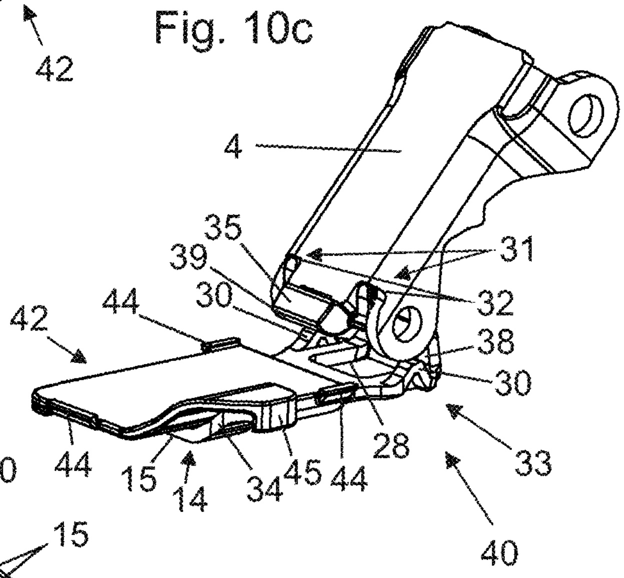
Figure 10D:
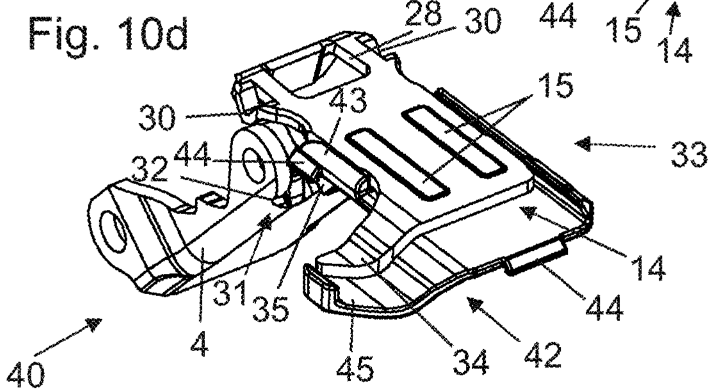

FIG. 10*b*, FIG. 10*c* and FIG. 10*d* differ from FIG. 10*a* only to the effect that the component parts for actuating the damping device during a movement of the articulated lever 4 are represented at a changed angle of view.

Figure 11:
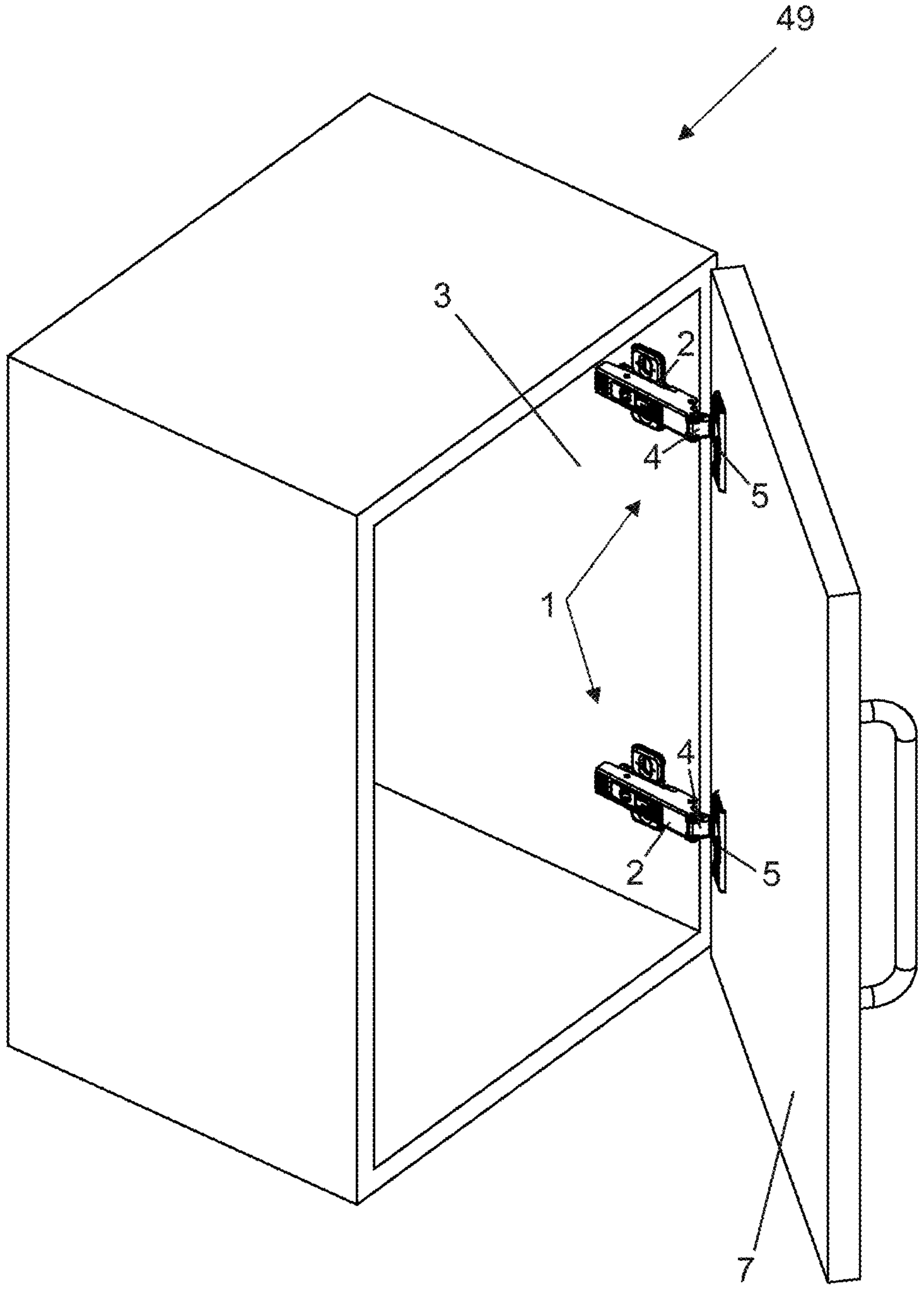
FIG. 11 shows a piece of furniture according to a preferred embodiment with two hinges according to the embodiment according to FIG. 1*a*.

FIG. 11 shows a piece of furniture 49 comprising a stationary furniture part 3 and a movably mounted furniture part 7 with two hinges 1, wherein the attachment parts 2 of the hinges 1 are arranged on the stationary furniture part 3 and the hinge cups 5 on the movable furniture part 7 are integrated in the movable furniture part 7 in areas.

However, the application of the hinge 1 is not limited to pieces of furniture 49 and can, for example, comprise the use in windows, doors or the like.

The invention claimed is:

1. A hinge, in particular furniture hinge, comprising:
- an attachment part configured to fasten the hinge to a stationary furniture part,
- an articulated lever,
- a hinge cup pivotably connected to the attachment part via the articulated lever, wherein the articulated lever and the hinge cup are mounted to the attachment part via a hinge pin, and the hinge cup is to be fastened to a movable furniture part,
- a damping device configured to damp a relative movement between the attachment part and the hinge cup between an open position and a closed position of the hinge, wherein the damping device comprises a linear damper including a piston and a translationally movable piston rod, the linear damper being at least partially arranged outside the hinge cup, and
- a translationally movable actuating element configured to actuate the damping device upon being pushed by the articulated lever to push the linear damper,
- wherein the actuating element is arranged inside the hinge cup, and the actuating element is separate and detached from the linear damper so as to be movable independent of the linear damper.

2. The hinge according to claim 1, wherein the actuating element:
- comprises a support surface via which the actuating element is arranged on an inside of a hinge cup base, and/or
- is guided inside the hinge cup in a groove or indentation in the hinge cup.

3. The hinge according to claim 2, wherein actuating element comprises a first opening or a first recess, and the hinge cup base comprises a second recess or a second opening.

4. The hinge according to claim 3, wherein the first opening or the first recess is rectangular, and the second recess or second opening at least partially overlaps the first opening or the first recess between the open position and the closed position, and the actuating element is formed of a metallic sheet metal part.

5. The hinge according to claim 2, further comprising an actuating element cover configured to translationally guide and/or secure the actuating element inside the hinge cup, wherein the actuating element is arranged between the hinge cup base and the actuating element cover, the actuating element cover comprising fastening elements for positive locking with the hinge cup base, and/or the actuating element cover comprises a cover bar.

6. The hinge according to claim 5, wherein the actuating element cover, the hinge cup base, and/or the actuating element comprises guide device configured to guide the actuating element, and the cover bar protrudes transversely from the actuating element cover and/or is bent inside the hinge cup.

7. The hinge according to claim 2, further comprising a sliding element on the actuating element for reducing friction between the actuating element and the hinge cup base and/or between the actuating element and an actuating element cover.

8. The hinge according to claim 7, wherein the sliding element is a film or nubs.

9. The hinge according to claim 1, wherein the hinge cup comprises a hinge cup opening through which the piston rod projects out of an exterior space of the hinge cup into the interior space of the hinge cup separated from the exterior space by a hinge cup side wall of the hinge cup.

10. The hinge according to claim 9, wherein the hinge cup and the damping device are configured such that, in the open position and/or the closed position, the piston rod is at least partially located outside the hinge cup.

11. The hinge according to claim 1, further comprising a hinge cup cover configured to at least partially cover the damping device.

12. The hinge according to claim 11, wherein the hinge cup cover is configured to completely cover the damping device, and the hinge cup cover:
- is configured to be clipped onto the hinge cup, and/or
- comprises a receiving area corresponding to a shape of the damping device.

13. The hinge according to claim 1, wherein the damping device is arranged on an outside of the hinge cup.

14. The hinge according to claim 13, wherein the damping device is arranged on the outside of the hinge cup so as to be rotatable or rigid and/or via a rivet or a pivot pin.

15. The hinge according to claim 1, wherein the hinge cup comprises a reinforcing indentation.

16. The hinge according to claim 15, wherein the damping device is configured to be brought to rest against the reinforcing indentation and/or is arranged on the reinforcing indentation.

17. The hinge according to claim 1, wherein the actuating element comprises a profiling, and the articulated lever comprises a control contour, wherein the actuating element is configured to be returned to a starting position before a damping stroke between the closed position and the open position due to a movement coupling between the profiling and the control contour.

18. The hinge according to claim 17, wherein the profiling is arranged next to an opening or a recess, and the control contour is formed as an undercut corresponding to the profiling, and wherein the actuating element is configured to be supported on the hinge cup and/or on a reinforcing indentation via the profiling.

19. The hinge according to claim 1, wherein the actuating element comprises a bar configured to contact the piston rod.

20. The hinge according to claim 19, wherein the bar protrudes transversely from a main body of the actuating element and/or is bent to contact the piston rod inside the hinge cup.

21. The hinge according to claim 1, further comprising a coupling mechanism configured to convert a rotational movement of the articulated lever into a linear movement of the actuating element.

22. The hinge according to claim 21, wherein the coupling mechanism comprises a fastening mechanism for mounting the coupling mechanism on the articulated lever.

23. The hinge according to claim 22, wherein the coupling mechanism is configured to engage in an opening or recess in the actuating element during an actuation of the damping device.

24. The hinge according to claim 21, wherein the actuating element comprises a contact surface for contacting the coupling mechanism, and the coupling mechanism and the contact surface are movement-coupled between the open position and the closed position to activate the damping device via a rotational movement of the articulated lever.

25. The hinge according to claim 24, wherein the coupling mechanism comprises a control curve for converting a rotational movement of the articulated lever into a linear movement of the piston rod.

26. The hinge according to claim 21, wherein the coupling mechanism and the actuating element are configured such that:

in a first movement portion starting from the open position of the hinge in a direction of the closed position of the hinge, the coupling mechanism is contactless with respect to the actuating element, and/or in a second movement portion following the first movement portion, the coupling mechanism contacts the actuating element.

27. The hinge according to claim 26, wherein the damping device is configured to be activated by the coupling mechanism via the actuating element exclusively in the second movement portion.

28. The hinge according to claim 21, wherein the coupling mechanism is joined to the articulated lever in a material-bonding manner and/or is separate from the at least one articulated lever, and the coupling mechanism is a plastic part and/or is arranged on the hinge pin via a support.

29. The hinge according to claim 1, wherein the damping device is substantially parallel to the actuating element.

30. A piece of furniture, comprising:

a stationary furniture part, a movably mounted furniture part, and the hinge according to claim 1, wherein the attachment part of the hinge is arranged on the stationary furniture part, and the hinge cup is at least partially integrated in the movable furniture part.

31. The hinge according to claim 1, wherein:

the linear damper is arranged completely outside the hinge cup, the actuating element has a one-piece construction separate from the articulated lever, and the actuating element is arranged completely inside the hinge cup.

32. The hinge according to claim 1, wherein the damping device is arranged outside of the hinge cup and along a lateral side of the hinge cup, a longitudinal axis of the lateral side of the hinge cup being parallel to a longitudinal axis of the damping device and orthogonal to a longitudinal axis of the hinge pin.

* * * * *